(12) United States Patent
Diedrich et al.

(10) Patent No.: US 8,247,125 B2
(45) Date of Patent: Aug. 21, 2012

(54) FUEL CELL SYSTEM

(75) Inventors: Thomas Diedrich, Gerwisch (DE); Martin Heumos, Finning (DE); Gert Hinsenkamp, Esslingen (DE); Patrick Mangold, Kirchheim (DE)

(73) Assignee: Daimler AG, Stuttgart (DE)

( * ) Notice: Subject to any disclaimer, the term of this patent is extended or adjusted under 35 U.S.C. 154(b) by 60 days.

(21) Appl. No.: 12/744,065

(22) PCT Filed: Nov. 12, 2008

(86) PCT No.: PCT/EP2008/009532
§ 371 (c)(1),
(2), (4) Date: May 21, 2010

(87) PCT Pub. No.: WO2009/071166
PCT Pub. Date: Jun. 11, 2009

(65) Prior Publication Data
US 2010/0316923 A1    Dec. 16, 2010

(30) Foreign Application Priority Data

Dec. 6, 2007    (DE) .................. 10 2007 058 717

(51) Int. Cl.
*H01M 8/04* (2006.01)
(52) U.S. Cl. ........................... 429/446; 429/444
(58) Field of Classification Search .................. None
See application file for complete search history.

(56) References Cited

U.S. PATENT DOCUMENTS

| | | | |
|---|---|---|---|
| 6,299,996 B1 * | 10/2001 | White et al. | 429/444 |
| 7,855,020 B1 * | 12/2010 | Margiott et al. | 429/415 |
| 2005/0249997 A1 * | 11/2005 | Tomimatsu et al. | 429/35 |
| 2006/0014074 A1 | 1/2006 | Tsuji et al. | |
| 2006/0115704 A1 * | 6/2006 | Arimura | 429/35 |
| 2007/0237996 A1 | 10/2007 | Kindervater et al. | |

FOREIGN PATENT DOCUMENTS

| | | |
|---|---|---|
| DE | 102004057140 A1 | 6/2006 |
| JP | 06251788 A | 9/1994 |
| WO | 2006032359 A | 3/2006 |

* cited by examiner

*Primary Examiner* — John S Maples
(74) *Attorney, Agent, or Firm* — Patent Central LLC; Stephan A. Pendorf

(57) ABSTRACT

The invention relates to a fuel cell stack (10) of a fuel cell system that is to be hermetically sealed off from the environment after operation is ended so that only a finite amount of air oxygen remains in the fuel cells, thus preventing the fuel cells from excessively aging. According to the invention, locking means (26, 28; 32, 34) are provided that are disposed on or in an end plate (14) or distributor plate of the fuel cell stack (10). The locking means (26, 28; 32, 34) are therefore thermally coupled to the end plate (14) and may freeze up at cold ambient temperatures. In a preferred embodiment, the locking means (26, 28; 32, 34) comprise an elastomer body (32, 34) able to cover and uncover a channel (44, 46) in the plate (14).

5 Claims, 2 Drawing Sheets

FUEL CELL SYSTEM

BACKGROUND OF THE INVENTION

1. Field of the Invention

The invention relates to a fuel cell system which comprises a fuel cell stack in a manner known per se, wherein air is supplied to the stack (on the cathode side) via an air supply and the waste air is discharged via an air discharge. The starting point for the air supply and the air discharge are an end plate, which closes the stack from the fuel cells, or a distributor plate, which can also be arranged in the center of the fuel cell stack. The entire air circulation is usually designed in such a manner that the fuel cell stack is supplied in an optimum manner with (air) oxygen, so that the reaction of hydrogen with the oxygen takes place there in an optimum manner. Fuel cells are sensitive components. If they are not in operation, the air oxygen can be damaging and especially effect a premature aging of the fuel cell, so that their lifespan is shortened.

2. Description of the Related Art

It is thus obvious to consider to seal the fuel cell when it is not in operation, so that new air oxygen cannot continuously reach the fuel cells. Such a seal has however not been realized up to now. In DE 10 2004 057 140 A1 is only described a valve provided at a side of a fuel cell stack, which serves however for adjusting the oxygen amount during the operation of the fuel cell stack. In order to seal the fuel cell stack with regard to air, locking means could simply be provided outside the fuel cell stack, namely in the air supply and the air discharge. Even if the locking means would be formed in a very simple manner, e.g. as air flaps, there would be the danger of the freezing of the flaps with could ambient temperatures with the consequence connected therewith that the fuel cell system cannot be operated again without further ado.

It is the object of the invention to further develop a fuel cell system in such a manner that a lifespan of the fuel cells is ensured which is as long as possible, without the described disadvantages occurring.

BRIEF SUMMARY OF THE INVENTION

The object is solved by a fuel cell system with locking means for blocking an air supply by the air supply line and locking means for blocking an air movement by the air discharge line are provided (in particular an air supply through this air discharge line, namely in the opposite direction to the conventional air movement). The locking means are arranged (directly) at or in the end plate or distributor plate connected to the air supply or the air discharge, namely at different plates, or both at the same plate.

This characteristic means that the locking means contact the respective plate or are integrated therein. The locking means are thereby thermally coupled to the fuel cell stack, and this remains warm for the longest period after the termination of the operation of the fuel cell system, so that it is prevented that water deposits at the locking means, which could then freeze at ambient temperatures which are too low.

In particular with the embodiment where the locking means contact the respective plate, it can be provided for the advancement of the exchange of heat energy between the fuel cell stack and the locking means that the locking means and the fuel cell stack are received together in an insulating housing (the so-called "stack box"). The locking means can be formed as a simple air flap. Embodiments are however also conceivable where a particularly good impermeability is given.

This is for example enabled if a first channel is formed in the end plate or distributor plate, which connects a connection for the air supply to an inlet on the stack side (towards a passage opening, a so-called "stack port"), and wherein a second channel is formed in the same end plate or distributor plate or a further plate, which channel connects an outlet on the stack side (a further passage opening, thus a further "stack port") to a connection for the air discharge, and the locking means can then simply be provided in the respective channel. By providing the locking means in the channel, they can ensure their impermeability in a particularly easy manner. Locking means can e.g. be used which comprise an expandable body (preferably an elastomer body). The expandable body can then unblock the channel during the operation of the fuel cell and can be expanded in such a manner when terminating the operation that it abuts the channel wall and blocks the channel completely. An expansion state of the expandable body can be fixed via a piston (by means of the piston sucking a fluid, e.g. a hydraulic fluid from the expandable body or pressing it into the expandable body), and this piston is preferably operated automatically by charging it e.g. with air supplied via the air supply line. If no further air is supplied then, namely if the operation of the fuel cell system is terminated, the locking means block automatically, and the communication of the fuel cell system with the ambient air is prevented, so that new air oxygen cannot continuously reach the fuel cells.

An advantage of the invention is, in addition to the basic enabling of a usable system for locking the fuel cell stack with regard to the outside air, the fact that the locking means are placed very close at the fuel cells, so that the blocked volume altogether is particularly small. As a residual reaction still takes place between the air oxygen and the hydrogen in the fuel cell stack after the termination of the operation, as much as possible and possibly the entirety of the air oxygen present in the fuel cell stack can be used in this manner, so that the fuel cells are exposed to as little oxygen as possible and can age as little as possible. The enclosed volume is smaller, the closer the locking means are arranged at the stack ports (inlet/outlet on the stack side), which also argues for the embodiment with the expandable body present in the channel.

BRIEF DESCRIPTION OF THE SEVERAL VIEWS OF THE DRAWINGS

In the following, a preferred embodiment of the invention is described with reference to the drawing, in which.

DETAILED DESCRIPTION OF THE INVENTION

Figure 1:
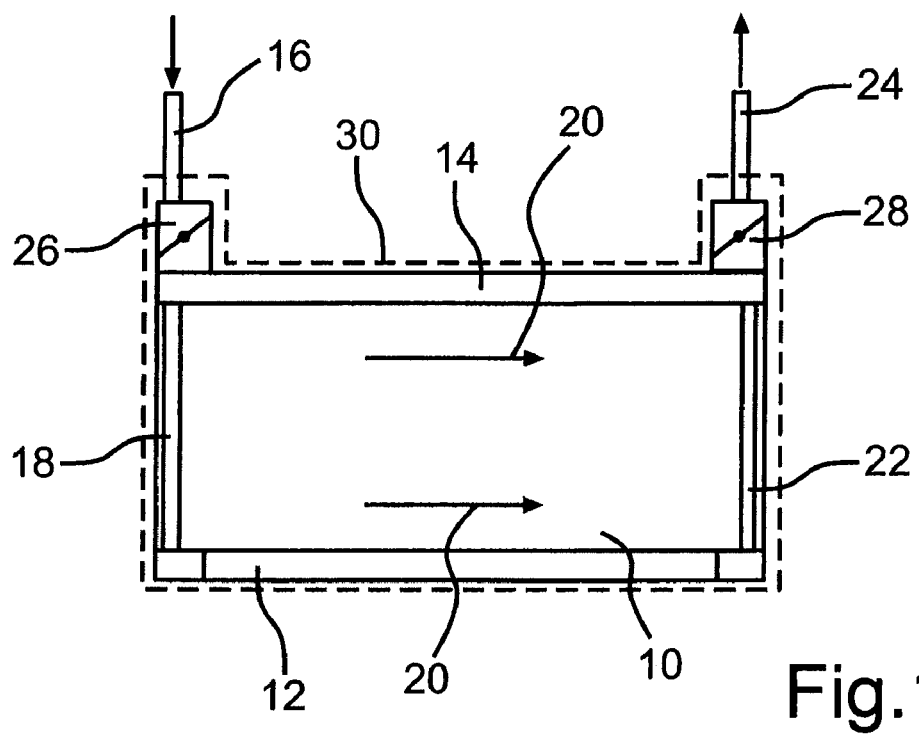
FIG. 1 shows a first embodiment of the fuel cell system according to the invention in a side view.

In a first embodiment of the invention, which is shown in FIG. 1, a fuel cell system has a fuel cell stack 10 formed in a conventional manner, which is held together at one side by a tensioning unit 12 and is closed by an end plate 14 on another side. The end plate 14 is coupled to an air supply 16, wherein the supplied air is guided to the individual fuel cells via so-called stack ports 18. The stack ports 18 are simply passage openings. The supplied air moves in the fuel cells according to the arrows 20 to a second stack port 22, which is formed the same as the stack port 18 and which leads to an air discharge 24. According to the invention, a locking flap 26 is now provided as locking means between the air supply 16 and the end plate 14. In the same manner, a locking flap 28 is also provided at the end plate 14 between the stack port 22 and the air discharge as a locking means. The locking flaps 26 and 28 both contact the end plate 14 and are thus thermally coupled to the fuel cell stack. After the termination of the operation of the fuel cell system, the locking flaps 26 and 28 are closed, so that no oxygen can be supplied to the fuel cells via the lines 16 and 24. The fuel cell stack cools after the termination of the operation bit by bit, and, due to the fact that the locking flaps 26 and 28 contact the end plate 14, these cool evenly with the fuel cell stack, so that they are not a preferred location for a freezing of water with cold ambient temperatures, as would be the case if the locking flaps 26 and 28 would not contact the end plate 14, that is, if they were connected approximately by tube lines to the end plate 14. By the omission of these tube lines, the volume confined by the locking flaps 26 and 28 is also particularly small, so that the fuel cell stack contacts a particularly small amount of oxygen after locking. The thermal coupling is reinforced with the embodiment according to FIG. 1 in that the fuel cell stack 10 and the locking flaps 26 and 28 are surrounded by a common housing 30, which boosts the exchange of heat energy from the fuel cell stack 10 to the locking flaps 26 and 28.

Figure 2:
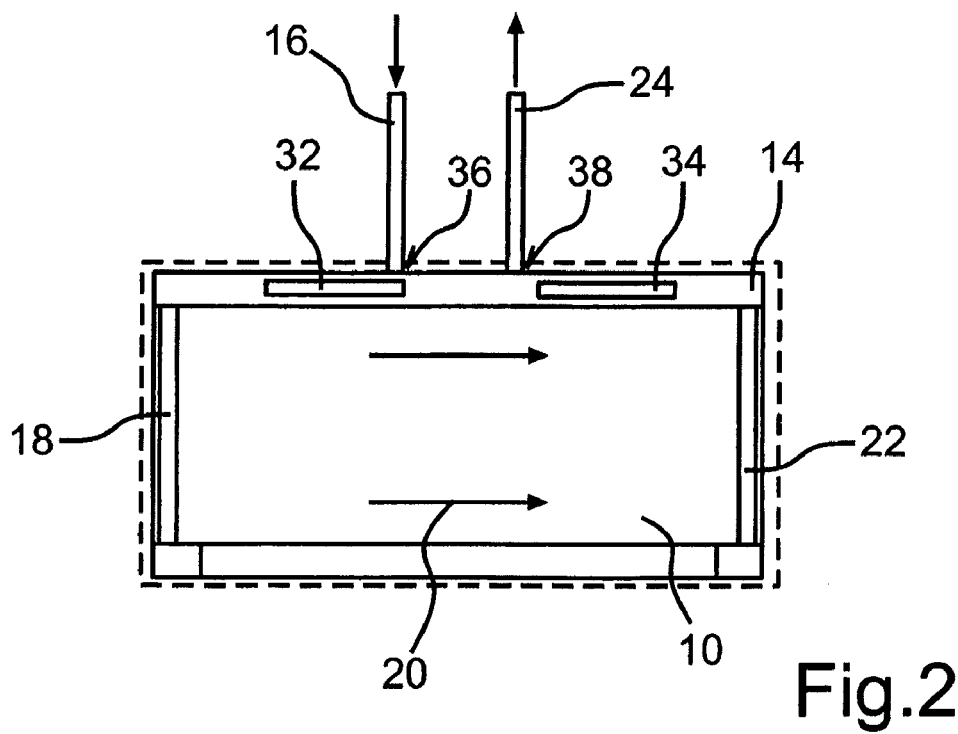
FIG. 2 shows a second embodiment of the fuel cell system according to the invention in a side view.
Figure 3:
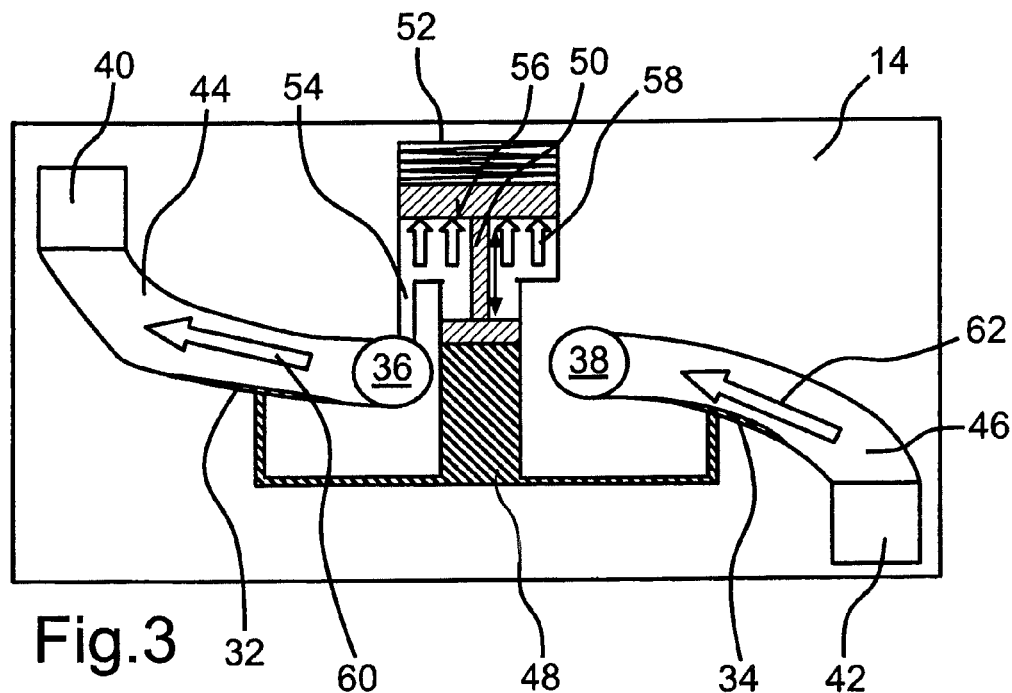
FIG. 3 is a top view of the fuel cell system of FIG. 2 during operation.
Figure 4:
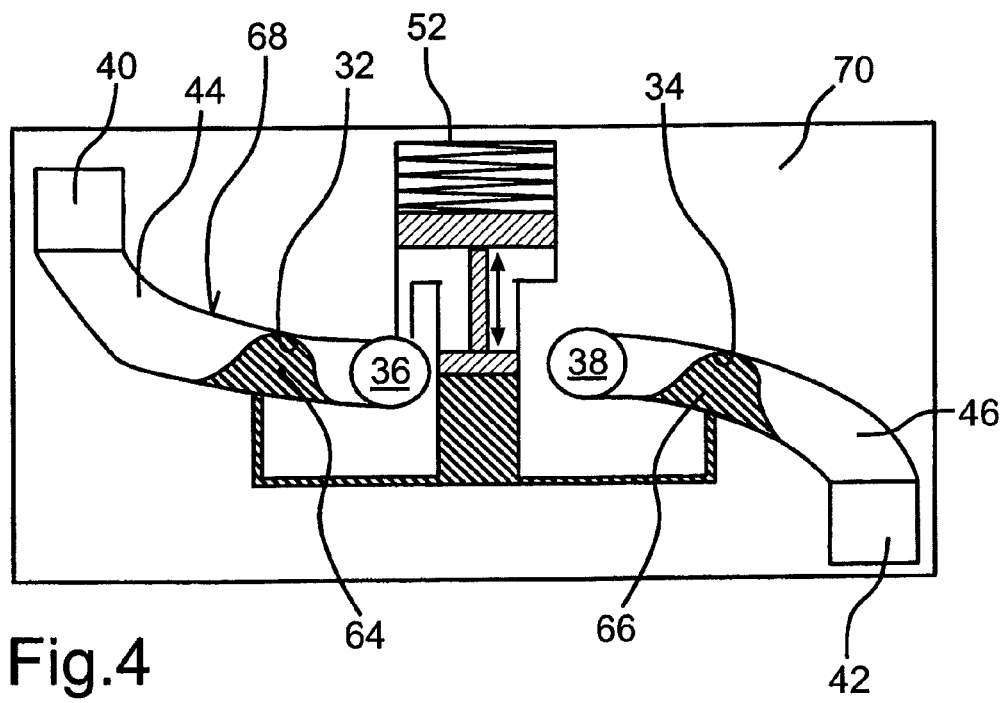
FIG. 4 is a top view of the fuel cell system of FIG. 2 after the termination of the operation.

With the embodiment according to FIG. 1, the locking means, namely the locking flaps 26 and 28, are arranged outside the fuel cell stack 10. It is now possible to integrate locking means into the fuel cell stack 10, name in particular into its end plate 14. This embodiment is shown in FIG. 2 in a side view, and in FIGS. 3 and 4 in a top view. 3 Elastomer bodies 32 and 34 now function as locking means. These can unblock and block a channel, which is formed in the end plate 14. In order that such a channel can be guided in a sensible manner, the lines 16 and 24 are offset compared to the embodiment according to FIG. 1, so that they do not continue the stack ports 18 and 22 in a straight manner. This can be seen particularly well in the top view according to FIG. 3 or FIG. 4. There, the connection 36 for the line 16 and the connection 38 for the line 24 is shown in a circular manner. The inlet 40 to the stack port 18 and the outlet 42 from the stack port 22 are shown in a square manner. A channel 44 leads from the connection 36 to the inlet 40 for the stack port, and a second channel 46 leads from the outlet 42 of the stack port to the connection 38. The elastomer body 32 is allocated to the channel 44, the elastomer body 34 is allocated to the channel 46. The elastomer bodies 32 and 34 can be filled with fluid, preferably a liquid from a fluid reservoir 48, namely under the action of a piston 50, which on its part is charged by a spring 52. A channel 54 leads from the connection 36 to an inner engagement surface 56 of the piston 50. When the fuel cell system is operated, air is continuously supplied through the air supply via an air compressor, not shown in the figures, and this air presses the piston in the direction shown by the arrows 58 against the surface 56 against the force of the spring 52 in such a manner that the fluid is sucked away from under the bodies 32 and 34 or remains, and the locking bodies 32 and 34 unblock the channels 44 and 46. Air can thereby circulate freely, see arrows 60 and 62. When the operation of the fuel cell system is now terminated, the air compressor is switched off, and air is not supplied anymore under pressure. The force of the piston 50 on the surface 56 thus decreases, and the piston 50 moves into the position shown in FIG. 4 under the action of the spring 52 and thereby presses the fluid into the locking bodies 32 and 34. As the locking bodies are expandable, that is, flexible, they impact the wall 68 or 70 of the channels 44 and 46 opposite the supply sides 64 and 66 and close these. The fuel cell stack is thereby sealed with regard to the ambient air. At least a part of the rest of the oxygen from the air in the fuel cell stack is still used by a further reaction. Due to the sealing of the channels 44 and 46, no new air oxygen can reach the fuel cell stack, and a premature aging of the fuel cells is, thereby prevented.

With the embodiments shown above, both locking means are respectively arranged at the or in the same end plate 14. It is essential for the invention that the locking means are actually respectively arranged at an end plate or distributor plate. Therefore, there is also the possibility that one locking means is arranged directly at or in a first plate (end plate or distributor plate) and that the other locking means is arranged directly at or in a second plate (end plate or distributor plate).

The invention claimed is:

1. A fuel cell system with
a fuel cell stack (10), whose fuel cells are connected to an air supply inlet (16) through an end plate (14) or distributor plate and which are connected to an air discharge (24) through an end plate (14) or distributor plate,
locking means (26, 32) for automatic unblocking or blocking of the air supplied via the air supply inlet (16), and
locking means (28, 34) for the automatic unblocking or blocking of air movement at the air discharge (24) during an operation or after a termination of the operation,
wherein each locking means (26, 28; 32, 34) is arranged directly in or at the end plate (14) or distributor plate connected to the air supply inlet (16) or in or at the end plate (14) or distributor plate connected to the air discharge (28, 34),
wherein a first channel (44) is formed in an end plate (14) or a distributor plate, which channel connects a connection (36) for an air supply inlet (16) to an inlet (40) on a stack side, and wherein a second channel (46) is formed therein or in another end plate or distributor plate, which connects an outlet (42) on a stack side to a connection (38) for the air discharge (24), and wherein the locking means (32, 34) are provided in a respective channel (44, 46),
wherein the locking means comprise an expandable body (32, 34), and
wherein an expansion state of the expandable body (32, 34) is fixed or limited by means of a piston (50), which is charged by air supplied by means of the air supply inlet (16).

2. The fuel cell system according claim 1, wherein the expandable body (32, 34) is an elastomer.

3. The fuel cell system according claim 1, wherein the charge of air of the piston (50) by air supplied by means of the air supply line (16) acts against the force of a spring (52).

4. The fuel cell system according to claim 1, wherein both locking means (32, 34) are arranged in or at the same end plate (14) or distributor plate.

5. A motor vehicle with a fuel cell system according to claim 1.

* * * * *